June 25, 1940. H. S. KIDWELL 2,205,480
FOCUSING AND PRINTING APPARATUS FOR PHOTOGRAPHIC ENLARGING
Filed April 11, 1939 2 Sheets-Sheet 2
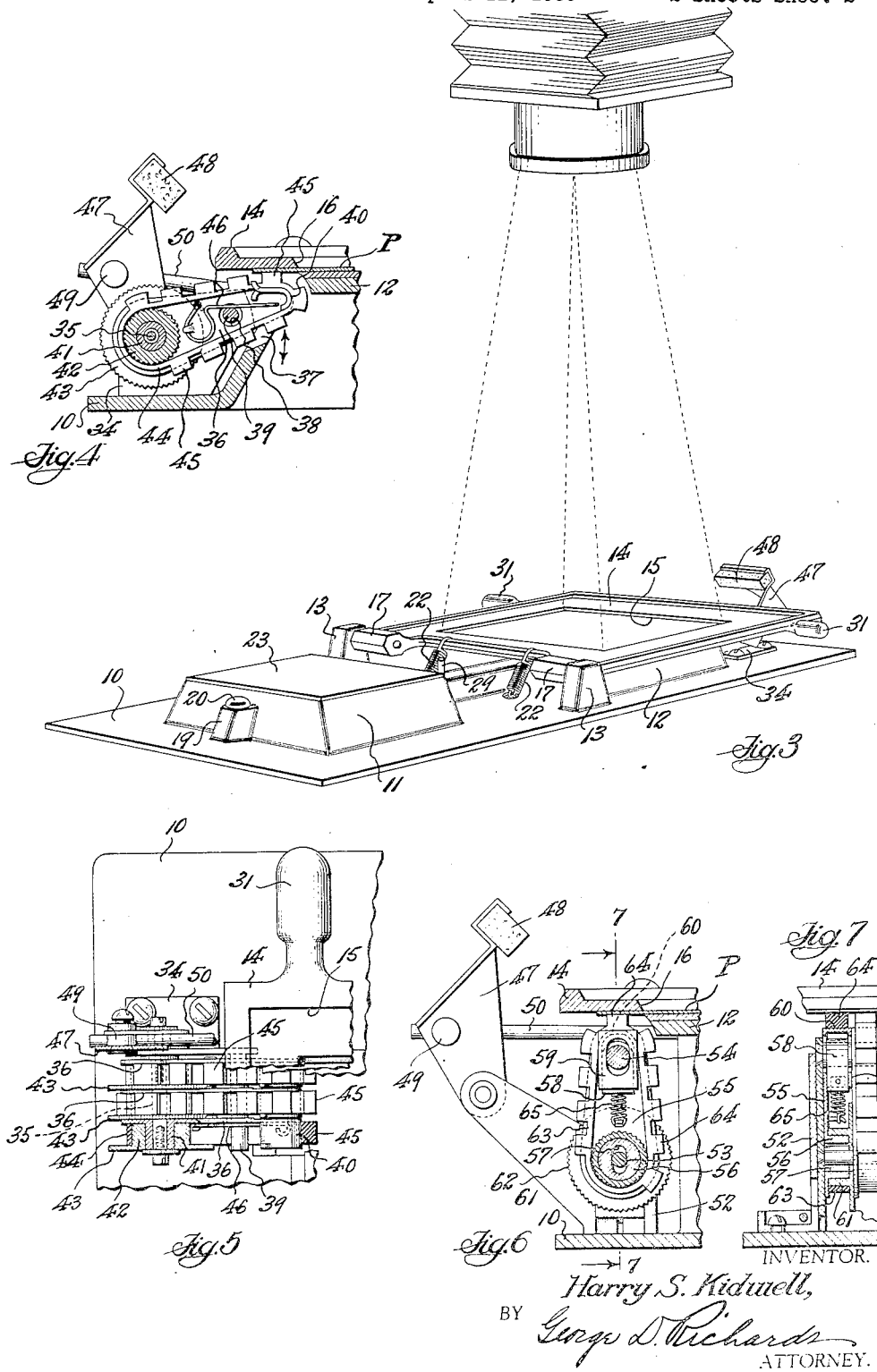
INVENTOR.
Harry S. Kidwell,
BY George D. Richards
ATTORNEY.

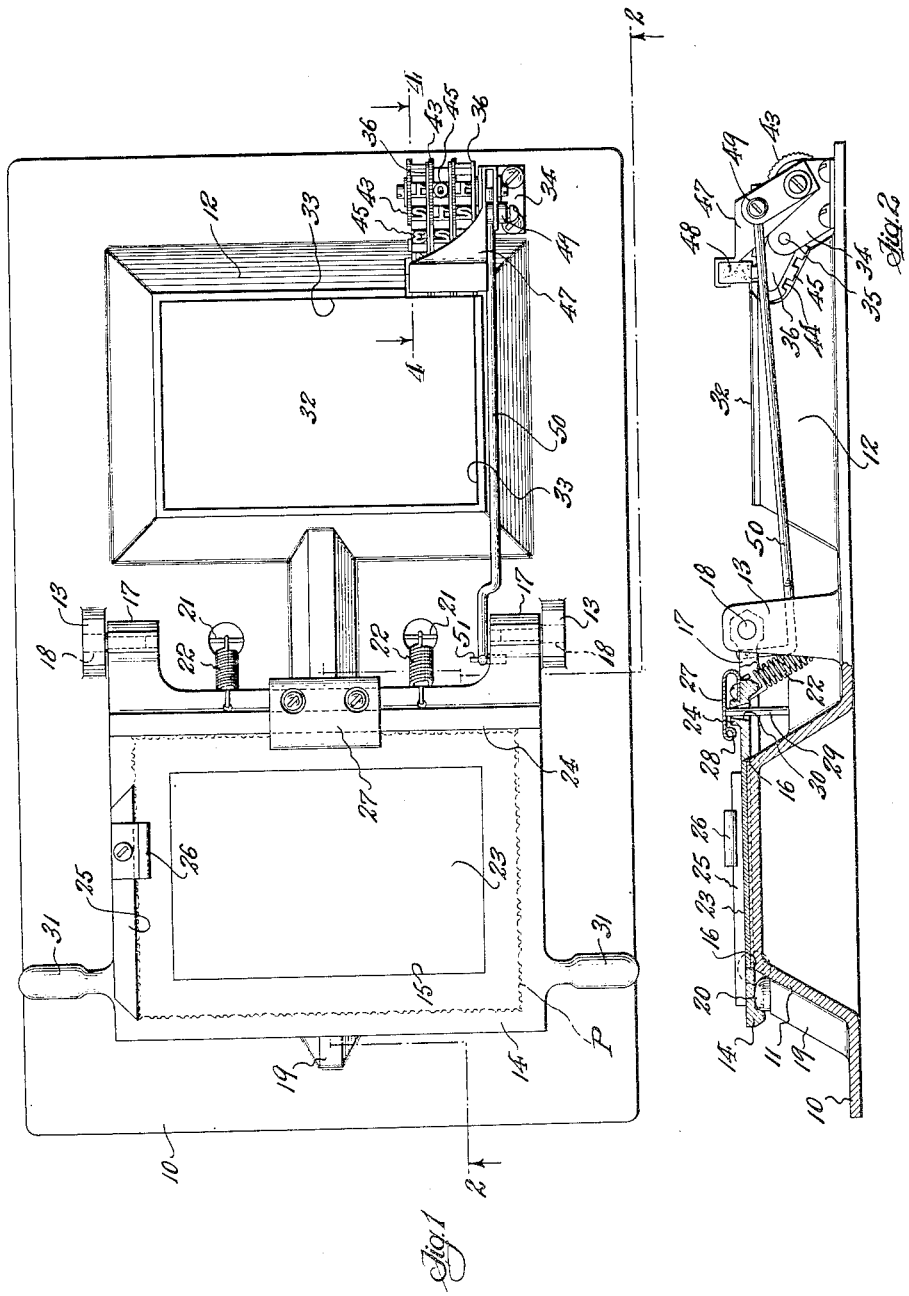

Patented June 25, 1940

2,205,480

UNITED STATES PATENT OFFICE 2,205,480

FOCUSING AND PRINTING APPARATUS FOR PHOTOGRAPHIC ENLARGING

Harry S. Kidwell, Chicago, Ill., assignor to the firm Henry G. Goetz, Irvington, N. J., composed of Henry G. Goetz and Henry F. Ruschmann Application April 11, 1939, Serial No. 267,213

7 Claims. (Cl. 88—24)

This invention relates to improvements in focusing and printing apparatus for use in producing photographic enlargements, and especially for producing enlarged prints from miniature film.

This invention has for an object to provide a simple easel structure for use with photographic enlarging means adapted to project light through photographic film from which an enlarged picture print is desired to be obtained; said easel combining means for focusing the projected image preparatory to printing, as well as means for holding and quickly bringing into printing position the sensitized paper upon which the enlarged print is desired to be reproduced.

This invention has for another object to provide a novel focusing and printing easel for the purposes stated, having a novel combined mask and paper holding means which is adapted to be easily and quickly loaded, and by which the photographic paper is automatically gripped and held in proper printing position while being printed as well as while being moved to and from printing position; said combined mask and paper holding means being of such novel form, construction and mode of operation as to not only assure rapid handling of the photographic paper, but also so as to avoid, in such handling, abrasion or injury to or soiling or finger marking of the emulsion coating of the paper, as well as fogging of the same.

The invention has for another object to provide a combined mask and paper holding means which is pivotally mounted for swinging movement to and fro between a loading and a printing station, and which so disposes and holds the photographic paper as to assure proper registration thereof in printing position free from any tendency to frictional movement or shift.

The invention has for a further object to provide a permanent focusing field at the printing station of the easel structure, said field being of white, washable material calculated to reflect a sharp and clearly defined projected test image when focusing preparatory to printing, said focusing field being also suitably marked with picture framing boundary lines of strong contrasting color, whereby the proper centering of the picture at the printing station is assured, so that all prints produced will be uniform.

Another object of this invention is to provide novel means for automatically stamping the several prints of a given lot produced with an identifying number.

Other objects of this invention, not at this time more particularly enumerated, will be understood from the following detailed description of the same.

An illustrative embodiment of this invention is shown in the accompanying drawings, in which—

Fig. 1 is a top plan view of the novel focusing and printing easel, with the combined mask and paper holding means thereof disposed in the loading station thereof; Fig. 2 is a part sectional and part elevational view, taken on line 2—2 in Fig. 1; Fig. 3 is a perspective view of the novel focusing and printing easel, with the combined mask and paper holding means thereof disposed in operative relation to the printing station thereof; Fig. 4 is a fragmentary vertical sectional view of the print stamping means, taken on line 4—4 in Fig. 1, but drawn on a somewhat enlarged scale; and Fig. 5 is a fragmentary view of the parts shown in Fig. 4, said parts being shown partly in plan and partly in horizontal section.

Fig. 6 is a fragmentary sectional view showing a modified form and construction of print stamping means; and Fig. 7 is a vertical cross sectional view of the same, taken on line 7—7 in Fig. 6.

Similar characters of reference are employed in the above described views, to indicate corresponding parts.

The novel focusing and printing easel according to this invention comprises a base plate 10 having adjacent to one end thereof a raised loading station platform 11 and adjacent to the other end thereof a raised printing station platform 12, said platforms being suitably spaced apart in relation one to the other. Projecting upwardly from said base plate 10 are a pair of transversely spaced and aligned bearing members 13 disposed on a line midway between the loading station platform 11 and the printing station platform 12.

The reference character 14 indicates the body or frame of a combined mask and paper holding means. Said frame is provided with an opening 15 of suitable size and peripheral shape corresponding to that of the enlarged picture desired to be reproduced. The interior margins of said frame opening 15 are of beveled formation 16 so as to eliminate reflection or casting of shadows on the surface of the photographic paper when undergoing a printing operation. Said body or frame 14 is provided with hinging arms 17 equipped with trunnion elements 18.

Said trunnion elements 18 are respectively journaled in the respective bearing members 13, thus pivotally mounting said body or frame for swinging movement to and fro between the loading station platform 11 and the printing station platform 12. Suitably arranged in connection with the base plate 10, and adjacent to the loading station platform 11, is an upstanding bumper post 19 having a bumper cushion 20 of resilient material. This bumper means not only engages the body or frame 14 to limit the movement thereof relative to the loading station platform 11, but also acts as a shock-absorber against slamming of said body or frame against said loading station platform. Interconnected between the hinged side of the body or frame 14 and anchor means 21 with which the base plate 10 is provided are pull spring elements 22. These spring elements 22 are anchored to the base plate 10 at points aligned with the axis of the hinging fulcrum of the body or frame 14, and consequently function to yieldably urge the latter toward and in stopped relation to the loading station platform 11, when said body or frame is swung toward and engaged with said platform 11, but, in like manner, when the body or frame is swung about its hinging fulcrum and past dead center toward the printing station platform 12, said spring elements thereupon yieldably urge the body or frame toward and in operative stopped relation to said printing station platform 12.

Affixed upon the top of the loading station platform 11 is a facing plate 23 sized to fit into the frame opening 15 of the body or frame 14 so as to lie flush with the paper receiving side of the latter, when the same is swung onto said loading station platform. This facing plate 23 possesses a smooth exposed surface so as to eliminate risk of scratching the emulsion coated face of photographic paper P, when mounting the latter upon the body or frame 14.

On its paper receiving side or face, said body or frame 14 is provided, along its inner longitudinal marginal portion with a raised paper stop member 24, and, likewise, along one of its lateral marginal portions with a similar raised paper stop member 25. Secured to the lateral paper stop member 25, so as to overhang the inner side thereof, is a keeper clip 26 operative to engage and hold the applied photographic paper P against lifting away from the body or frame 14, especially should the paper P possess tendency to curl or belly away from the body or frame.

Secured to the body or frame 14, to extend over and inwardly overhang said longitudinal paper stop member 24, is a resilient paper gripper clip 27, the free margin of which is provided with a rounded gripper bead or jaw 28 opposed to the paper receiving face of the body or frame 14. Said gripper clip 27 is preferably made of springy sheet metal the tension of which is adapted to normally urge its gripper bead or jaw 28 toward the paper receiving face of the body or frame 14. Affixed to the base plate 10, in upstanding projection therefrom, is a gripper clip releasing post or pin 29. When the body or frame 14 is swung onto the loading station platform 11, the upwardly projecting free end of said post or pin 29 passes through an opening 30, with which the body or frame 14 is provided, into lifting engagement with the underside of said gripper clip 27, thus upwardly flexing the later and thereby lifting its gripper bead or jaw 28 away from and in raised spaced relation to the paper receiving face of the body or frame 14 (see Fig. 2).

The body or frame 14 is provided with finger piece means whereby the same may be conveniently manipulated by the user. Preferably such finger piece means comprise one or more finger pieces 31 disposed to project laterally from one or both side margins of the body or frame 14.

The upper face of the printing station platform 12 is suitably treated to provide a permanent focusing field adapted to visibly display a picture projected thereon by light traversing the film from which enlargements are desired to be obtained. To this end the top face of said printing station platform is provided with a coating 32 of suitable substance preferably of white color, and of a kind capable of being cleansed by washing. This coating may consist of a lacquer, enamel, paint or the like. This coating is also preferably provided with picture area indicating or framing lines 33 of contrasting color to define an area corresponding to the area of the enlarged printed photographs desired to be produced. It will be obvious that, prior to beginning printing operations, the user may focus upon the field provided by the coating 32, and view the resultant picture image so as to assure clear definition of the picture subject and the location thereof in an area corresponding to the area of the printed photograph desired to be obtained.

In the use of the novel photographic enlargement printing easel, it is very often desirable to identify given batches of enlargements produced with an individual record number. This invention therefore includes means for automatically effecting such marking of the prints as the same are made. To this end a novel construction and arrangement of number stamping means is provided in connection with the printing station platform 12. In one form thereof said stamping means comprises a supporting bracket 34 which is affixed to the base plate 10 behind the printing station platform 12. Carried by said bracket 34 is a fixed horizontal bearing shaft 35 by which is supported a plurality of sets of changeable number stamping devices arranged side by side. Each stamping device comprises a carrier plate 36 pivotally mounted by its rear end portion on said shaft 35 with its opposite or forward end portion projecting into a receiving cavity 37 formed in the printing station platform 12. Toward its free end each carrier plate 36 is provided with a stop opening 38 through which extends a stop pin 39 which is affixed to and which projects horizontally from the supporting bracket 34. At its free end each carrier plate has a rounded nose 40. At its rearward end portion, each carrier plate is provided with a journal hub 41, and rotatably mounted on said journal hub is a drive roller 42 provided with an annular finger piece flange 43 by means of which said roller 42 may be turned. Running over and between the roller 42 and nose 40 of each carrier plate 36 is an endless belt 44 from the outer surface of which projects a series of stamp elements or types 45 respectively bearing numerals 0 to 9 inclusive in spaced successive order along the extent of said belt 44. Suitably anchored to each carrier plate 36 is a pressure spring element 46 which is puchased upon the stop pin 39, whereby its tension exerts an uptilting thrust upon the free end portion of the carrier plate 36 and the stamp elements or types 45 associated therewith, whereby the face of the selected stamp element or type adjusted to occupy the innermost upstanding position is projected to printing disposition in a plane normally slightly above the plane of the top surface of the printing station platform 12. It will be obvious that by manipulating the belts 44 any desired stamp element or type 45 may be disposed in said printing position and in such association with its fellows on adjacent belts as to produce a desired identifying number for application to given prints which are being made.

Cooperative with the stamping devices is an automatic means for inking the operative stamp elements or types thereof. This inking means comprises an oscillatable inker arm 47 which is fulcrumed on the shaft 35, and which is suitably shaped at its free end portion to hold an inking pad 48 of suitable ink absorbent composition. Connected to said inker arm 47 by a swiveling knuckle member 49 is one end of a connecting rod 50, the opposite end of which is coupled by a pivot pin 51 to a hinging arm 17 of the combined mask and paper holding frame 14. In operation when said frame 14 is swung outward onto said loading platform 11, it exerts a pull upon said connecting rod 50 operative to swing down said inker arm 47 whereby the inking pad 48 is carried into inking contact with the faces of the operative stamp elements or types 45. When said frame 14 is swung inward onto said printing station platform 12, it exerts a thrust upon said connecting rod 50 operative to swing upward said inker arm 47 and its pad 48 away from the operative stamp elements or types 45 and out of the path of movement of said frame 14 as it moves into printing position over said platform 12. It will thus be obvious that the inking of the operative stamp elements or types is automatically effected by operative manipulations of the body or frame 14.

In Figs. 6 and 7 there is shown a somewhat modified form and construction of stamping means, the stamping devices of which are disposed in vertical positions relative to the base plate 10. This modified form of stamping means comprises a supporting bracket 52 having suitably affixed thereto a pair of vertically spaced horizontally extending bearing shafts 53 and 54. Mounted on said bearing shafts are vertically movable sets of changeable member stamping devices arranged side by side. Each stamping device comprises a carrier plate 55 provided adjacent to its lower end portion with a journal hub 56 having a vertical slotway 57 to straddle the lower bearing shaft 53. Fixed on the upper shaft 54 is a guide-block 58. The upper end portion of the carrier plate 55 is doubled upon itself to provide therewith slotted yoke means 59 to slidably straddle the guide block 58 and shaft 54, the transverse connecting portion 60 of said yoke means constitutes an operative stamp element or type support. Rotatably mounted on the journal hub 56 is a drive roller 61 having an annular finger piece flange 62 by means of which said roller 61 may be turned. Running over and between said roller 61 and the operative stamp element or type support 60 is an endless belt 63 from the outer surface of which projects a series of stamp elements or types 64 respectively bearing numerals 0 to 9 inclusive. Suitably anchored to each carrier plate 55 is the lower end of a pull spring 65, the upper end of which is affixed to the guide block 58. The tension of said spring 65 exerts an uplifting thrust upon the stamping device it serves, whereby the stamp element or type 64 located in operative position over the support 60 is yieldably urged somewhat above the top plane of the printing station platform 12 so as to be engageable by the back of photographic paper P carried by the body or frame 14 and deposited, by proper manipulation of the latter, upon the printing station platform.

In the use of the novel easel, after the projected image of a film to be enlarged is focused and registered on the focusing field, the combined mask and paper holding frame 14 being disposed bottom side up upon the loading station platform 11, the operator places the photographic paper P over the bottom side of said frame 14, so that a longitudinal margin thereof abuts the stop member 24 and a lateral margin thereof abuts the stop member 25. The paper P is thus laid with its emulsion coated face toward the frame opening 15. When the paper is thus positioned on the frame 14, the clip 26 will retain the same against curling or bellying away from the frame, while the inner longitudinal marginal portion of the paper will underlie the raised gripper clip 27.

When the photographic paper is disposed as described, the frame is swung forwardly and onto the printing station platform 12. As the frame 14 is lifted, the gripper clip 27 is carried away from the upwardly flexing post or pin 29, whereby its tension causes said gripper clip 27 to swing downwardly so as to move its gripper jaw 28 into clamping engagement with the paper, thus firmly holding the latter against displacement when the frame 14 is manipulated.

As the frame is swung onto the printing station platform it will be reversed so as to expose that portion of the sensitized face of the paper to be printed through the opening 15, while masking the marginal portions of the paper. As the paper P is thus carried into printing position, the back thereof will also be carried into engagement with the stamping devices, so that the latter will stamp thereon a desired identifying number. After the paper is exposed to the projected image from a film to be enlarged so as to be printed therewith, the frame 14 is swung back onto the loading station platform 11, and the printed paper is removed for development and fixing. These operations may be successively repeated until a desired number of prints are obtained.

It will be obvious that the novel easel device not only facilitates the handling and printing of photographic paper with ease and rapidity, but also assures accurate and uniform registry of the printed image on the paper.

It will be understood that many apparently widely different embodiments of this invention could be made without departing from the scope thereof as defined in the following claims. It is therefore intended that all matter contained in the foregoing description or shown in the accompanying drawings shall be interpreted as illustrative and not in a limiting sense.

I claim:

1. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening, means to pivotally mount said frame on said base plate intermediate said platforms to swing to and fro between the same for selective supported engagement therewith, and means for clamping paper to be printed upon said frame.

2. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening, means to pivotally mount said frame on said base plate intermediate said platforms to swing to and fro between the same for selective supported engagement therewith, spring means intermediate said base plate and frame adapted to yieldably retain the latter in supported engagement with one or the other of said platforms accordingly as selectively engaged therewith, and means for clamping paper to be printed upon said frame.

3. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening, means to pivotally mount said frame on said base plate intermediate said platform to swing to and fro between the same for selective supported engagement therewith, paper positioning stop means on said frame for registering applied paper with the frame opening, and yieldable means for clamping the so applied paper against displacement.

4. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening, means to pivotally mount said frame on said base plate intermediate said platforms to swing to and fro between the same for selective supported engagement therewith, spring means intermediate said base plate and frame adapted to yieldably retain the latter in supported engagement with one or the other of said platforms accordingly as selectively engaged therewith, paper positioning stop means on said frame for registering applied paper with the frame opening, and yieldable means for clamping the so applied paper against displacement.

5. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening and means to register applied paper relative to said opening, means to pivotally mount said frame on said base plate intermediate said platforms to swing to and fro between the same for selective supported engagement therewith, spring gripping clip means on said frame to hold paper applied thereto against displacement, and a clip means release pin upstanding from said base and operative to disengage said clip from the applied paper when said frame is supportingly engaged upon said loading station platform.

6. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having a paper exposure opening and means to register applied paper relative to said opening, means to pivotally mount said frame on said base plate intermediate said platforms to swing to and fro between the same for selective supported engagement therewith, spring gripping clip means on said frame to hold paper applied thereto against displacement, a clip means release pin upstanding from said base and operative to disengage said clip from the applied paper when said frame is supportingly engaged upon said loading station platform, and spring means interconnected between said frame and base plate operative to yieldably retain the frame in supported engagement with one or the other of said platforms accordingly as selectively engaged therewith.

7. A device for the purposes described comprising, a base plate having a raised loading station platform and a raised printing station platform relatively spaced thereon in horizontal plane, the latter platform being adapted to be aligned beneath an overhead optical projector, a combined mask and paper holding frame having an exposure opening, means to pivotally mount said frame on said base platform intermediate said platforms to swing to and fro between the same for selective supported engagement therewith, an indicia stamp means yieldably supported from said base plate at the printing station platform for engagement by frame carried paper when the frame is moved onto said platform, swingable inking pad means cooperative with said stamp means, and a link interconnecting said frame and pad means whereby movement of the frame from and toward said printing station platform automatically moves said pad means into and out of operative contact with said stamp means.

HARRY S. KIDWELL.